United States Patent
Fujimoto et al.

(10) Patent No.: US 6,842,835 B1
(45) Date of Patent: Jan. 11, 2005

(54) STORAGE SUBSYSTEM AND ITS CONTROLLING METHOD

(75) Inventors: Takeo Fujimoto, Odawara (JP); Shigeru Kishiro, Odawara (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/625,732

(22) Filed: Jul. 24, 2003

Related U.S. Application Data

(63) Continuation of application No. 09/987,894, filed on Nov. 16, 2001, now Pat. No. 6,611,903.

(30) Foreign Application Priority Data

May 11, 2001 (JP) ........................................ 2001-140954

(51) Int. Cl.[7] .............................................. G06F 12/16
(52) U.S. Cl. ...................................... 711/162; 711/165
(58) Field of Search ................................. 711/161, 162, 711/165, 148; 707/204; 714/6

(56) References Cited

U.S. PATENT DOCUMENTS

| | | | |
|---|---|---|---|
| 6,611,903 B2 * | 8/2003 | Fujimoto et al. | ............ 711/162 |
| 6,725,293 B1 * | 4/2004 | Nakayama et al. | ............ 710/36 |
| 2002/0049746 A1 | 4/2002 | De Roose | |
| 2002/0156942 A1 | 10/2002 | Tyndall | |
| 2002/0174139 A1 | 11/2002 | Midgley et al. | |

* cited by examiner

Primary Examiner—Hiep T. Nguyen
(74) Attorney, Agent, or Firm—McDermott Will & Emery LLP

(57) ABSTRACT

A storage subsystem in which write data written in a first storage subsystem from a plurality of host computers is copied onto a second storage subsystem, thereby protecting the write data in a multiplex manner. Disclosed are a storage subsystem and its controlling method in which the first storage subsystem has a storage control unit which sets a first threshold for controlling for each of the host computers an occupancy ratio of the write data whose copy to the second storage subsystem is incomplete in a data buffer in the first storage subsystem, and has control logic for delaying the processing of a data write request from each of the host computers on the basis of the first threshold.

19 Claims, 10 Drawing Sheets

STORAGE SUBSYSTEM AND ITS CONTROLLING METHOD

This application is a continuation of application Ser. No. 09/987,894 filed Nov. 16, 2001, now U.S. Pat. No. 6,611,903.

BACKGROUND OF THE INVENTION

The present invention relates to a storage subsystem and its controlling method, and more particularly to a technique which is effective by being applied to such as the technique of multiplexing data by data copy among a plurality of storage subsystems installed at remote places or the like.

Due to the progress of information society in recent years, there has been an explosive increase in the amounts of data stored in storage devices of computer systems used in information processing in various fields of social activities, and there has been a demand for high reliability for both the data and the system. As a technique for satisfying both the reliability of data and the assurance of the system operation, the multiplexing of storage devices themselves is being undertaken. The data outputted from a host computer is copied not only to the storage device directly connected thereto but also to other storage devices via that storage device.

Generally, this technique is called remote copy, and its application to computer systems requiring high reliability is being implemented. According to this remote copy technique, even if a fault has occurred in one storage device and the storage device has lapsed into an inoperable state, the system can be operated by using the data of another storage device.

A remote-copy controlling system has been realized in which when a host computer stores data in a storage device connected to the host computer (hereafter, this storage device will be referred to as a master-side storage device), the master-side storage device is able to, synchronously or asynchronously with the data transmission, copy the data to another storage device connected to the master-side storage device (hereafter, this storage device will be referred to as a remote-side storage device).

In the event that a fault has occurred in the master-side storage device and the master-side storage device has lapsed into an inoperable state, the data remaining in the remote-side storage device can be used as they are by merely changing over the storage device which becomes active to the remote side.

In addition, remote copy to remote plates is also being practiced via public lines. Even if a large-scale natural disaster or the like has occurred in the place or the city where the master-side storage device is installed, insofar as the damage does not reach the remote-side storage device located in the remote place, the system as a whole is able of operate continuously simply by effecting a changeover to the remote-side system.

Generally, since the remote copy to a remote place takes time in data transmission, the master-side storage device issues a response of reception complete upon storage of the data in an internal buffer, and subsequently effects data transmission to the remote-side storage device asynchronously with host transmission.

At present, the above-described technique is realized even in the midst of the input or output of the data, and the starting of the copy to the remote side or a changeover of the system is possible without stopping the online system.

In recent years, the transfer performance between host computers and master-side storage devices continues to be improved remarkably as exemplified by the fact that Fibre Channel Protocol has been standardized by ANSI and NCITS T11. On the other hand, channel resources for connection between master-side storage devices and remote-side storage devices are limited for economic reasons, and cannot be expanded unlimitedly. In particular, when a system having the remote copy function is structured, if a measure against wide-area disasters is taken into consideration, it is desirable to install the remote-side storage device farther away from the master-side storage device. However, if remote copy to a remote place is effected, even if a public line is used or a private line is laid, huge costs are incurred.

As a result, in comparison with data transfer channels between the host computer and master-side storage device, remote copy channels between the master-side storage device and the remote-side storage device are inevitably limited in number, and the marginal performance of data transmission is relatively low.

Accordingly, for example, in the event that the storage of data from master-side host computers occurs in large volumes in excess of the marginal performance of the remote copy channel, the remote copy cannot follow the speed, so that uncopied data overflow from the data buffer inside the master-side storage device. If the data buffer of the master-side storage device becomes full, acceptance of new writing of data from the hosts is prohibited to prevent the occurrence of the loss of data. However, it becomes impossible to store data from the other host computers just when a large volume of data flows from one of the plurality of host computers connected to the master-side storage device.

In the case where a plurality of host computers are connected to the master-side storage device, all the host channels do not necessarily have the same degree of importance. It is conceivable that there are variations in the performance requirements of the host channels and in the amount of data transferred. For example, trouble can conceivably occur that even when data storage occurs in a large channel whose performance requirement is low or which is relatively unimportant, and the above-described phenomenon of the full data buffer occurs, the writing of data from other host channels which are important becomes impossible, and this has been a major technical problem in operation.

Meanwhile, in recent years, in conjunction with the improvement of performance of personal computers, workstations, and the like with general-purpose operating system (OS) for small computers installed, these small computers have come to be connected to storage subsystems as host computers in addition to the mainframe.

For this reason, it is conceivable to adopt a form of operation in which, on the storage subsystem side, in addition to the mainframe-system host interface, the so-called open-system host interface for small computers is provided to allow both the mainframe-system and open-system host computers to share the storage subsystem.

In that case, it is not realistic to connect a plurality of storage subsystems for effecting remote copy of data by the above-described diverse interfaces due to the economic limitation of the remote copy channels as described above, and there is a technical problem in that it becomes necessary to uniformalize the data format among the different host connection interfaces.

SUMMARY OF THE INVENTION

Accordingly, it is an object of the present invention to provide a storage subsystem capable of effecting remote copy of write data among a plurality of storage subsystems with the order of priority corresponding to the degrees of importance of the plurality of host computers connected to the storage subsystems, as well as its controlling method.

Another object of the present invention is to provide a storage subsystem capable of realizing efficient remote copy among a plurality of storage subsystems without being affected by an increase in the load of data writing by a specific host computer among a plurality of host computers connected to the storage subsystems, as well as its controlling method.

Still another object of the present invention is to provide a technique capable of structuring an efficient remote copy system by uniformalizing diverse connection interfaces between a plurality of host computers and storage subsystems to a connection interface among the plurality of storage subsystems for effecting the remote copy of data.

In accordance with one aspect of the invention, there is provided a storage subsystem including a first storage subsystem connected to a plurality of host computers via a first interface and a second storage subsystem connected to the first storage subsystem via a second interface so as to copy write data written in the first storage subsystem from the host computer onto the second storage subsystem from the first storage subsystem, thereby protecting the write data in the first and the second storage subsystems in a multiplex manner, the storage subsystem comprising: a storage control unit provided in the first storage subsystem and having a first threshold for controlling for each of the host computers an occupancy ratio of the write data whose copy to the second storage subsystem is incomplete in a data buffer in the first storage subsystem, and control logic for delaying the processing of a data write request from each of the host computers on the basis of the first threshold which is set for each of the host computers.

In accordance with another aspect of the invention, there is provided a method of controlling a storage subsystem including a first storage subsystem connected to a plurality of host computers via a first interface and a second storage subsystem connected to the first storage subsystem via a second interface so as to copy write data written in the first storage subsystem from the host computer onto the second storage subsystem from the first storage subsystem, thereby protecting the write data in the first and the second storage subsystems in a multiplex manner, the method comprising: a first step of setting for each of the host computers a first threshold for controlling an occupancy ratio of the write data whose copy to the second storage subsystem is incomplete in a data buffer in the first storage subsystem; and a second step of delaying the processing of a data write request from each of the host computers on the basis of the first threshold which is set for each of the host computers.

More specifically, in the invention, Fibre Channel Protocol is adopted as a path of remote copy in the remote copy between storage subsystems, and the following means are adopted:

(1) A means is provided whereby the ratio of resources such as buffer capacity which can be used is defined in units of host computers connected to the master-side storage device, i.e., the first storage subsystem, and can be set via a user interface.

(2) The capacity of data buffer used in the master-side storage device is automatically measured separately for each host to determine the ratio of the buffer capacity being used by each host.

(3) If the total amount of data buffer used is large, the ratio of the buffer capacity being used by each host is compared with the ratio of usable resources which has been set by the user setting, and the influx of write data from a host channel whose amount of use has been excessively large is limited.

(4) As the means for limiting the data influx from host channels, the master-side storage device is provided with logic for causing the hosts to wait.

(5) The data copy from the data buffer in the master-side storage device to the remote-side storage device, which is the second storage subsystem, is effected randomly. Consequently, when viewed from the host computers, the scheduling of remote copy is effected in accordance with the set ratio.

DESCRIPTION OF THE EMBODIMENT

Figure 1:
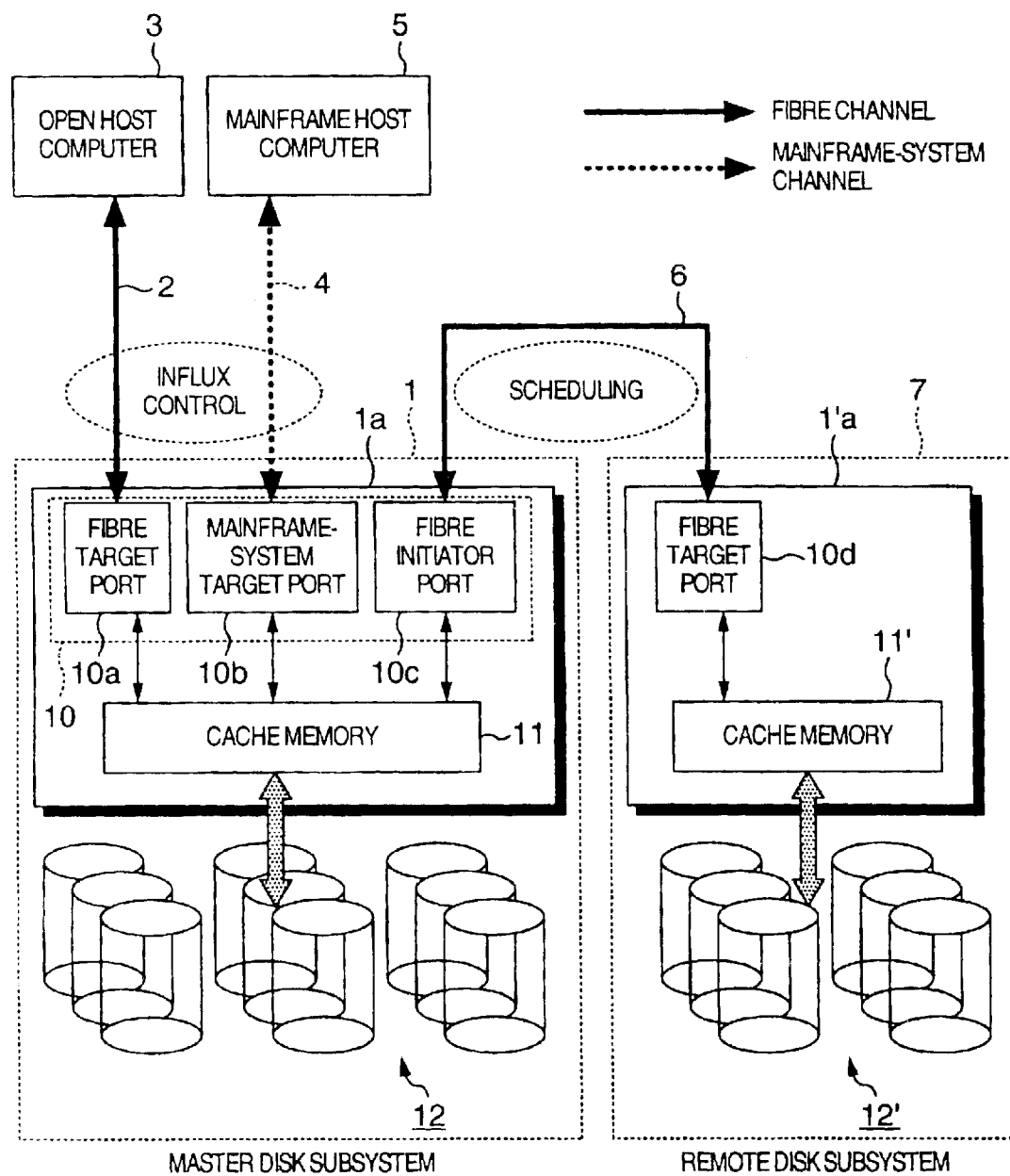
FIG. 1 is a conceptual diagram illustrating an example of the configuration of an information processing system using a storage subsystem for carrying out the method of controlling a storage subsystem in accordance with an embodiment of the invention.
Figure 2:
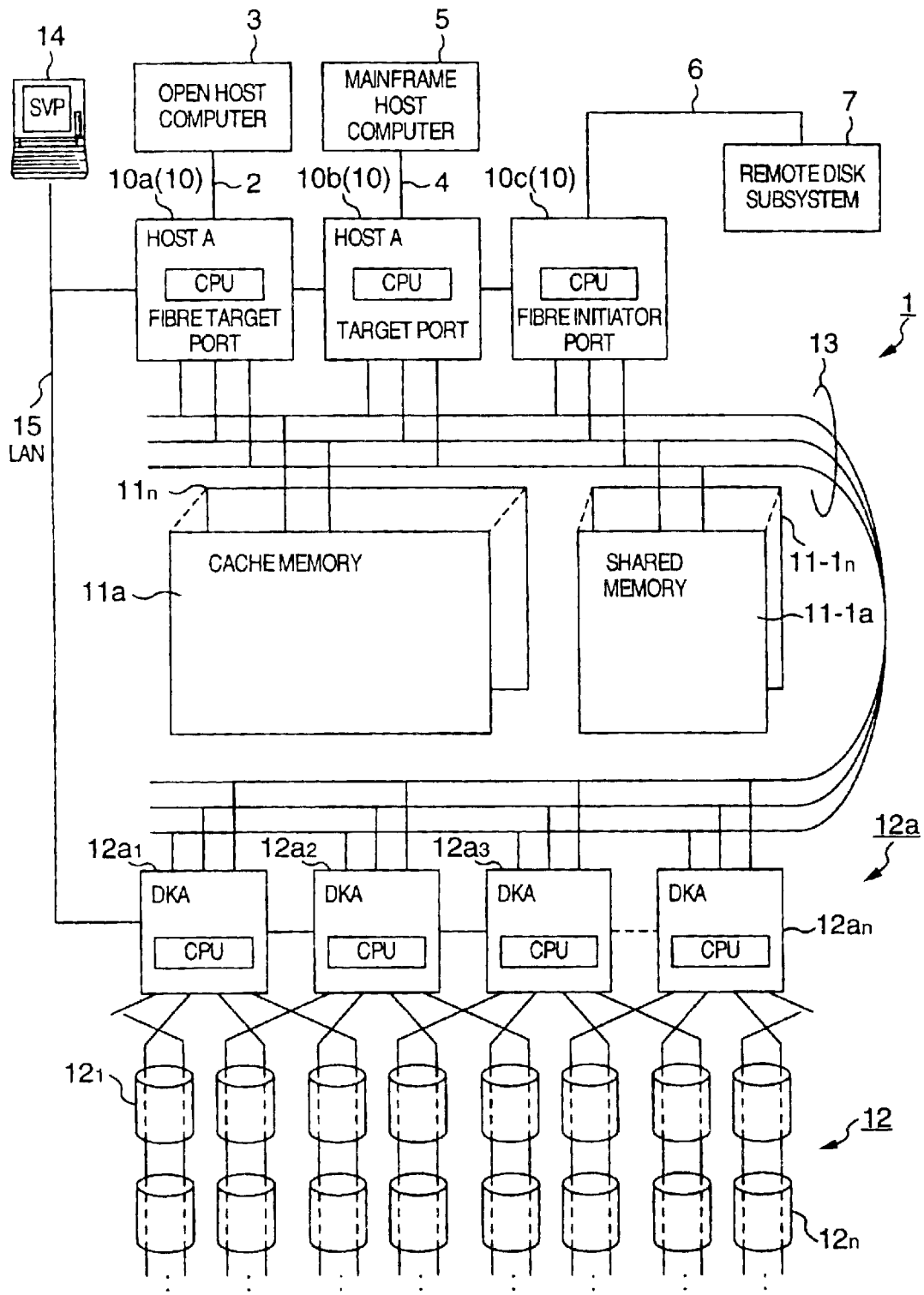
FIG. 2 is a conceptual diagram illustrating in greater detail the example of the internal configuration of the storage subsystem in accordance with the embodiment of the invention.

Referring now to the accompanying drawings, a detailed description will be given of an embodiment of the invention. FIG. 1 is a conceptual diagram illustrating an example of the configuration of an information processing system using a storage subsystem for implementing a method of controlling a storage subsystem in accordance with an embodiment of the invention. FIG. 2 is a conceptual diagram illustrating in detail an example of the internal configuration of the storage subsystem in accordance with the embodiment.

The storage subsystem in accordance with this embodiment is comprised of a master disk subsystem 1, a remote disk subsystem 7, and a fibre channel 6 for remote copy for connecting them.

The master disk subsystem 1 is configured by a plurality of input/output ports 10 for connection to external circuits;

a storage control unit 1a including cache memories 11 (11a to 11n) and shared memories 11-1 (11-1a to 11-1n) serving as buffers for temporarily storing input/output data; and a disk array 12 which is a data storage medium. A fibre-channel target port 10a constituting one input/output port 10 of the master disk subsystem is connected to an open host computer 3 via a fibre channel 2, while a mainframe-system channel target port 10b is connected to a mainframe host computer 5 via a mainframe-system channel 4.

In addition, a fibre-channel initiator port 10c constituting another input/output port 10 of the master disk subsystem 1 is connected to a fibre-channel target port 10d of the remote disk subsystem 7 via the fibre channel 6 for remote copy. In other words, the master disk subsystem 1 behaves as a host computer with respect to the remote disk subsystem 7.

The storage control unit 1a of the master disk subsystem 1 is provided with a plurality of disk adapters 12a (12a 1 to 12an) for controlling the input and output of data between the cache memory 11 and the disk array 12.

In the storage control unit 1a, the fibre-channel target port 10a, the mainframe-system channel target port 10b, the fibre-channel initiator port 10c, the disk adapters 12a, the cache memories 11, and the shared memories 11-1 are interconnected by buses 13. The transmission and reception of information among these elements are effected via the buses 13.

Although in this embodiment the description is given by using the buses 13, star network connection using switches may be realized as the means for connecting the elements.

Namely, the fibre-channel target port 10a, the mainframe-system channel target port 10b, the fibre-channel initiator port 10c, and the disk adapters 12a have respectively independent processors (CPUs), and effect controlling operation through mutual cooperation in such as the input/output processing of data by parallel operation by the reference to and updating of control information which is set in the shared memories 11-1, as will be described later.

The configuration of the remote disk subsystem is similar to that of the master disk subsystem 1, and is provided with the fibre-channel target port 10d for inputting and outputting to and from a disk array 12' data transmitted via the fibre channel 6 for remote copy, as well as the storage control unit 1a having cache memories 11'. Since the detailed configurations of the respective constituent elements are identical to those of the corresponding constituent elements provided in the master disk subsystem 1, the relevant constituent elements will be denoted by the same reference numerals, and an overlapping explanation will be omitted.

It should be noted that although the fibre-channel target port 10a, the mainframe-system channel target port 10b, and the fibre-channel initiator port 10c of the master disk subsystem 1 in the embodiment illustrated in FIG. 1 are shown as being single units, they may be additionally installed as plural units, respectively. Further, the same also applies to the input/output port of the remote disk subsystem 7.

An unillustrated host computer may be connected to the remote disk subsystem 7 in the same way as the master disk subsystem 1.

As illustrated in FIG. 2, the master disk subsystem 1 has an external connection interface 15 such as a LAN, and a service processor (SVP) 14 constituted by a small personal computer or the like is connected thereto. A user is able to define the path configuration of remote copy to the master disk subsystem 1 via the SVP 14. In addition, the user is also able to set a total ratio threshold 40 (which will be described later) for the system and individual ratio thresholds 32 (which will be also described later) for the respective target ports as various control information concerning the use of side files (which will be described later) in this embodiment, as will be described later.

Figure 3:
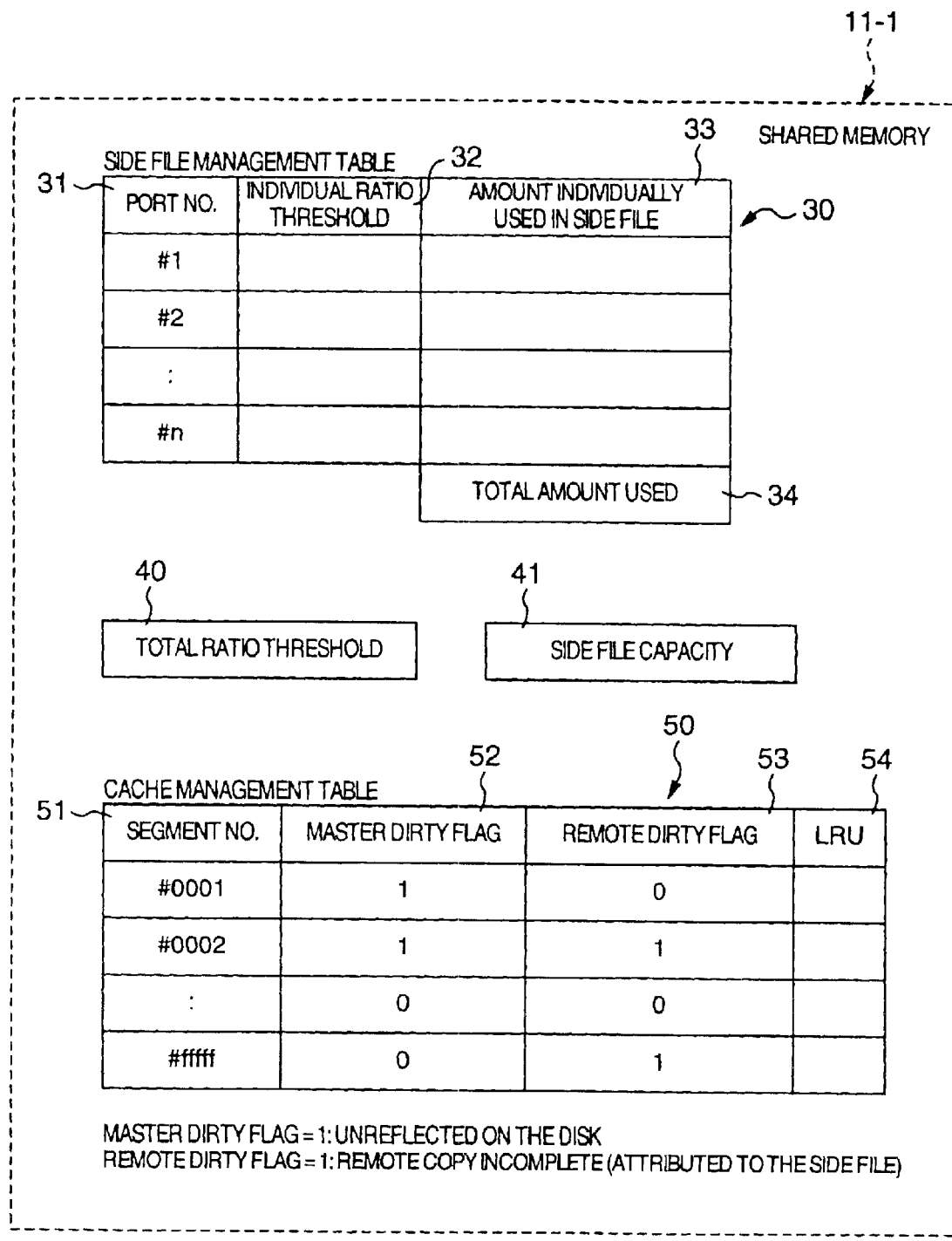
FIG. 3 is a conceptual diagram illustrating an example of control information used in the storage subsystem in accordance with the embodiment of the invention.

FIG. 3 is a conceptual diagram illustrating an example of control information used in the storage subsystem in this embodiment.

In the case of this embodiment, a side file management table 40, the total ratio threshold 40, a side file capacity 41, and a cache management table 50 are set in the shared memory 11-1 as control information.

In the side file management table 30, information including the individual ratio threshold 32, an individually used amount 33 in a side file, and so on, which are set for each host computer connected to a relevant port, is set for the entry of each of a plurality of port numbers 31 for individually identifying the host computer connection ports (i.e., the host computers themselves), such as the fibre-channel target port 10a and the mainframe-system channel target port 10b which are respectively connected to the open host computer 3 and the mainframe host computer 5.

Stored in the cache management table 50 are segment numbers 51 for identifying a plurality of segments which are set by dividing the storage area of the cache memory 11, as well as master dirty flags 52, remote dirty flags 53, LRU management information 54, and the like, which are set in correspondence with the respective segment numbers 51.

The cache memory 11 effects storage of data by using the aforementioned segment as a unit. At the time of the writing of data in the cache memory 11 from the host side through the fibre-channel target port 10a and the mainframe-system channel target port 10b, a write complete signal is returned to the host when the data has been stored in the segment of the cache memory 11. The actual writing from the cache memory 11 to the disk array 12 through the disk adapter 12a and the remote copy from the cache memory 11 to the remote disk subsystem 7 through the fibre-channel initiator port 10c are executed asynchronously with the writing of data in the cache memory 11 from the host side.

Namely, the master dirty flag 52 (=1) shows a state in which the relevant write data is unreflected on the disk array 12 side in the segments which hold the write data written in the cache memory 11 from the host side. The master dirty flag 52 is set (=1) by the fibre-channel target port 10a and the mainframe-system channel target port 10b at the time of writing the data, and is reset (=0) by the disk adapter 12a after reflection on the disk array 12.

The remote dirty flag 53 (=1) shows a state in which remote copy to the remote disk subsystem 7 side is incomplete in the segments which hold the write data written in the cache memory 11 from the host side. The remote dirty flag 53 is set (=1) by the fibre-channel target port 10a and the mainframe-system channel target port 10b at the time of writing the write data to the cache memory 11, and is reset (=0) by the fibre-channel initiator port 10c upon completion of the remote copy.

In the case of this embodiment, the side file refers to a set of buffers (segments) which is in a state in which the remote dirty flag 53 (=1) is set and the remote-copy incomplete data is temporarily stored in the aforementioned segments in the cache memory 11.

The aforementioned side file capacity 41 shows a maximum number of segments making up this side file, and is set by a system manager from the SVP 14.

Stored in the LRU management information 54 is information for controlling the assignment of segments of the cache memory 11 with respect to new write data and release of the segments which are out of use.

In this embodiment, the total ratio threshold 40 is a threshold for triggering the start of influx limiting control with respect to a used capacity of the side file. If the ratio of a total amount used 34, which is an aggregate total (the total of the individually used amounts 33) of the data whose remote copy to the remote disk subsystem 7 has not been completed, to the side file capacity 41 of the side file has exceeded this threshold, the limitation of influx of write data from the host side is initiated while referring to the individual ratio thresholds 32.

The individual ratio threshold 32 in the side file management table 30 refers to the ratio of the side file capacity which can be respectively used by the data stored from the individual hosts. The data copy to the remote disk subsystem 7 is also carried out in accordance with the order of priority defined by this ratio, as will be described later in detail. A default value is set so that each connected host computer can use all the side files uniformly, but the user is able to define a high individual ratio threshold 32 with respect to the host channel whose amount of access is large, whose performance requirement is high, or which is important, while taking into account the data access pattern of each host computer.

Figure 4:
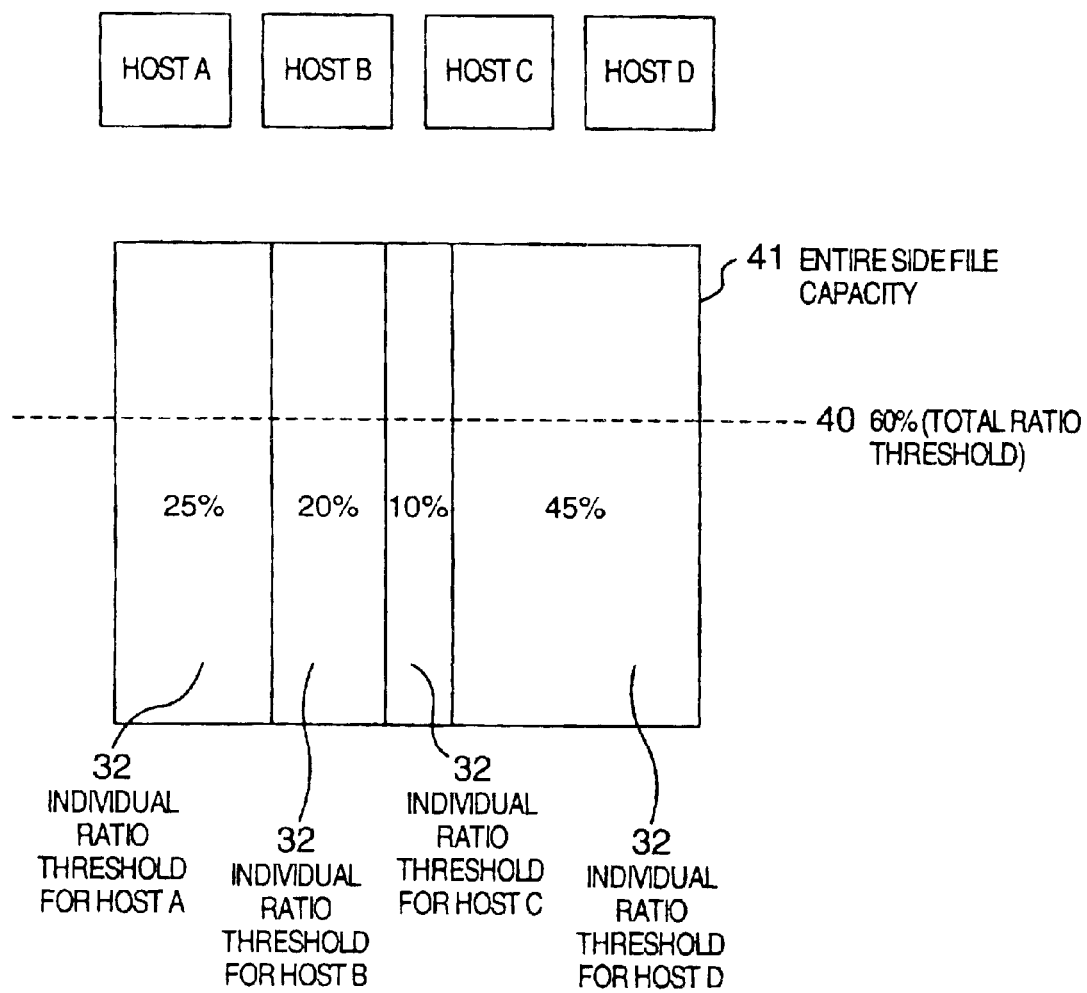
FIG. 4 is a conceptual diagram illustrating an example of the operation of the storage subsystem in accordance with the embodiment of the invention.

As an example, FIG. 4 shows a schematic diagram of an example in which the total ratio threshold and the individual ratio thresholds are set in the master disk subsystem to which four host computers are connected. In the example shown in FIG. 4, at a point of time when the aggregate total of data in the side files used by hosts A to D has exceeded 60% of the side file capacity 41, control of the limitation of influx of write data for each host computer on the basis of the individual ratio threshold 32 is initiated.

In the case of FIG. 4, the order of priority of acceptance of write data and remote copy after the start of this influx limitation control, in the descending order of the individual ratio threshold 32, is the host D, host A, host B, and host C.

Hereafter, a description will be given of an example of the operation in accordance with this embodiment.

First, the total ratio threshold 40, the side file capacity 41, and the individual ratio thresholds 32 are set appropriately through the SVP 14. This setting operation can be effected during the operation at any time.

After the initialization at the time of the system startup, or upon the receipt of an instruction for forming a remote copy path, the fibre-channel initiator port 10c issues N_Port login (PLOGI) processing to all the ports whose addresses have been detected. At the time of returning an acknowledgement (ACC) with respect to the PLOGI, the fibre-channel connected equipment normally stores in its payload a WWN (World Wide Name) peculiar to the port and set forth in Fibre Channel standards. Since the WWN is set in advance in accordance with a fixed rule with respect to the port corresponding to the remote copy in this embodiment, the fibre-channel initiator port 10c is able to identify the fibre-channel target port 10d of the remote disk subsystem 7 subject to remote copy by checking the WWN stored in each ACC.

If it is determined that the port is an untargeted port, a logout (LOGO) is immediately outputted, and a logout from that port is made. If it is determined that the port is the fibre-channel target port 10d of the remote disk subsystem 7 subject to remote copy, a process login (PRLI) is subsequently issued to form a remote copy path.

Figure 8:
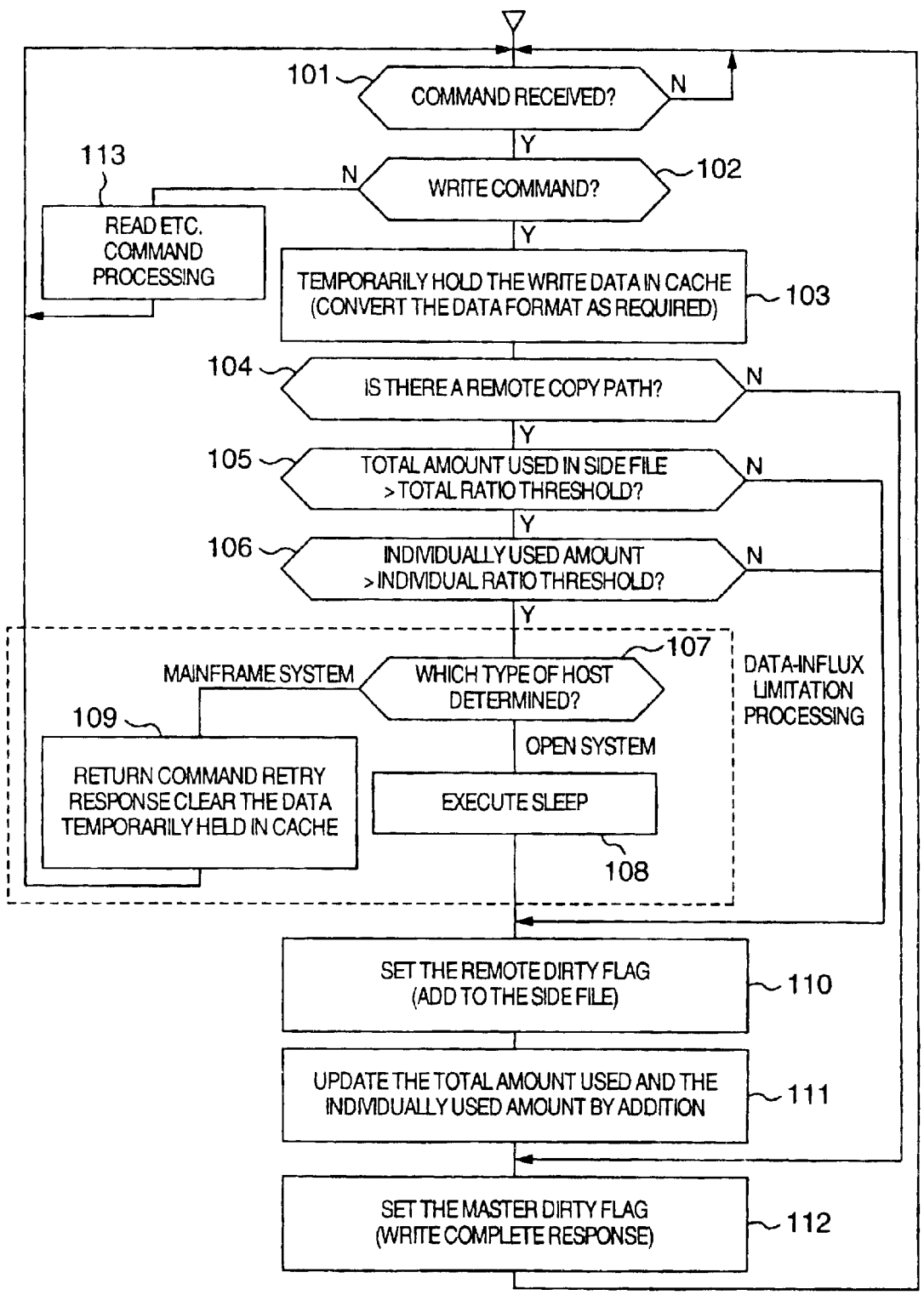
FIG. 8 is a flowchart illustrating an example of the operation of the storage subsystem in accordance with the embodiment of the invention.

After such preparatory processing, the processing of a write command accompanying the limitation of influx of write data from the host side is executed in accordance with the flowchart illustrated in FIG. 8.

For example, upon receiving a data write command (as for commands other than the write command, processing is effected in Step 113, and the operation returns to wait for a command) from the open host computer 3 (Steps 101 and 102), the fibre-channel target port 10a of the master disk subsystem 1 temporarily stores the write data in the cache memory 11 (Step 103), and checks information on the formation of a remote copy path (Step 104). If the remote copy path has not been formed, the fibre-channel target port 10a sets the master dirty flag 52, and jumps to Step 112 to return a response of data acceptance (write complete) to the open host computer 3. However, if the remote copy path has been formed, the fibre-channel target port 10a subsequently checks the total ratio threshold 40 (Step 105).

In this Step 105, the total amount used 34 (the aggregate total of the individually used amounts 33 of the plurality of ports) in the side files of the cache memory 11 is calculated, and unless the ratio of the used capacity (the total amount used 34) to the side file capacity 41 does not exceed the total ratio threshold 40 (total amount used 34>side file capacity 41×total ratio threshold 40) set in advance for the system, the remote dirty flag 53 is set, and the segment in which the relevant write data is held is added to the side file (Step 110). At the same time, the total amount used 34 (the aggregate total of the individually used amounts 33) and the individually used amount 33 are updated (Step 111). Further, the master dirty flag 52 is set, and a reply of data reception is returned to the host computer (Step 112).

In Step 105, if the used capacity (the total of the individually used amounts 33) has exceeded the total ratio threshold 40 (total amount used 34>side file capacity 41×total ratio threshold 40), the individual ratio thresholds 32 set in the relevant fibre-channel target port 10a are further checked (Step 106).

Namely, in this Step 106, if the ratio of the individually used amount 33 in the side file used by the write data stored from the open host computer 3 to the total amount used 34 has not exceeded the predetermined individual ratio threshold 32 set in advance for that fibre-channel target port 10a (individually used amount 33≦individual ratio threshold 32×total amount used 34), the fibre-channel target port 10a jumps to Step 110 and returns a response of normal termination to the host computer (executes Steps 110 to 112 mentioned above). However, if the ratio has exceeded the individual ratio threshold 32 (individually used amount 33>individual ratio threshold 32×total amount used 34), the fibre-channel target port 10a determines the type of host computer (Step 107). In this case, since the system is an open system, the fibre-channel target port 10a executes sleep processing included in Fibre Channel Protocol (Step 108) to delay the response to the open host computer 3 as much as possible. Here, the reason for delaying the response is to limit the influx speed of data from the host side. It can be readily appreciated that if while the data influx speed is being slowed down, progress is made in the remote copy to the remote disk subsystem 7 illustrated in the flowchart in FIG. 9 (which will be described later) which is asynchronously executed in parallel, the side file of the data portion whose copy has been completed is freed, so that the ratio of the write data of the relevant host computer occupied in the data buffer decreases.

In the embodiment shown in the flowchart of FIG. 8, the arrangement provided is such that after a determination is first made in Step 105 as to whether or not the write data stored in the cache has exceeded the total ratio threshold 40 of the overall side file capacity 41, a determination is made on the individual ratio threshold 32 for each of the hosts.

In addition, as another embodiment, an arrangement may be provided such that, instead of the overall side file capacity 41, the individual ratio thresholds 32 assigned in accordance with the order of priority of the individual hosts may be preferentially determined, and the write data may be compensated for starting with a host having a higher priority. In the case where priority is placed on the individual ratio thresholds 32 for the respective hosts, Step 105 in FIG. 8 is omitted, and data influx limitation processing is effected by the determination of the individual ratio thresholds in Step 106 alone.

The data written in the master disk subsystem 1 and the remote disk subsystem 7 can be read by reversely tracing the route of writing by a read command from the service processor 14, for example.

After the fibre-channel target port 10a of the master disk subsystem 1 has acknowledged the data reception to the open host computer 3, the buffer capacity (individually used amount 33) used by the fibre-channel target port 10a (open host computer 3) is added, and is stored so as to be used in an ensuing determination.

Figure 9:
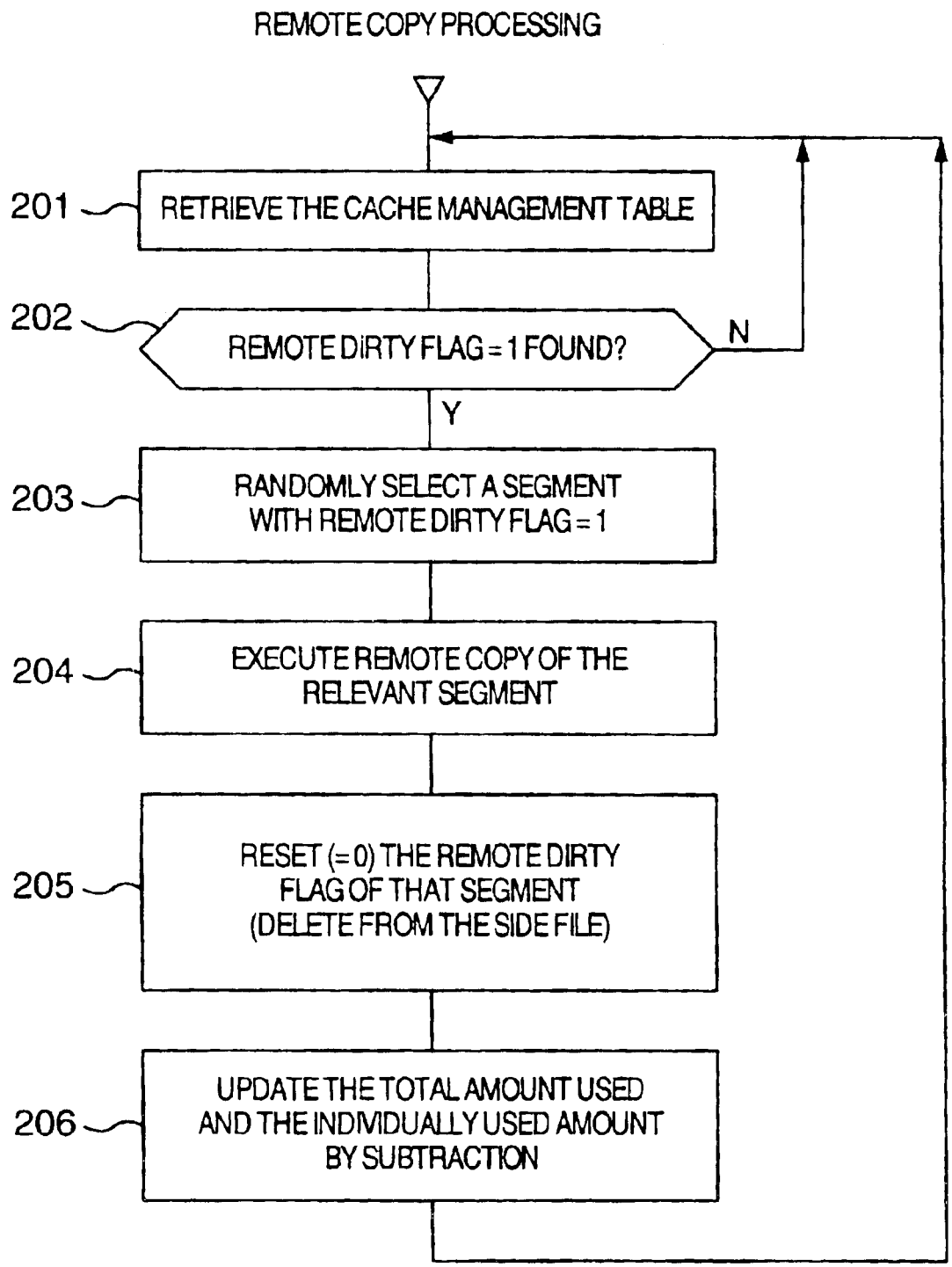
FIG. 9 is a flowchart illustrating an example of the operation of the storage subsystem in accordance with the embodiment of the invention.

As illustrated in the flowchart in FIG. 9, a microprogram for scheduling the remote copy is incorporated in the fibre-channel target port 10a of the master disk subsystem 1 which executes the remote copy asynchronously with the data writing in the cache memory 11 from the host side.

Namely, information on the management of the side files (remote dirty flag 53) is constantly retrieved (Steps 201 and 202), and data (segment) for which the remote copy has not been completed IS randomly selected (Step 203). An exclusive command for remote copy is issued to the fibre-channel target port 10d of the remote disk subsystem 7 for which a remote copy path has been formed (Step 204).

In this embodiment, with respect to the fibre-channel initiator port 10c of the master disk subsystem 1 and the fibre-channel target port 10d of the remote disk subsystem 7, a unique command (vendor unique command) is added to SCSI-FCP (Fibre Channel Protocol) Protocol. In the SCSI-FCP Protocol, FCP CDB is defined in a 16-bit format. The exclusive commands for remote copy are largely classified into three types of a write command, a read command, and a control/sense command. Although a description of a detailed format will be omitted herein, in each type a special command (vendor unique command) is set to an operation code in a leading byte, and detailed information such as the transfer length, the type of subblock, and the like is thereafter stored in the respective bytes of subcodes and parameters. Thus it becomes possible to execute processing unique to remote copy while observing the frame format of Fibre Channel Protocol including the link level.

It is assumed that the fibre-channel target port 10d of the remote disk subsystem 7 has control logic capable of coping with the aforementioned exclusive commands for remote copy in addition to normal commands from the host. Upon receiving a write command for remote copy, the fibre-channel target port 10d of the remote disk subsystem 7 secures a region for storing data in the cache memory, and returns transfer ready.

Upon receiving the transfer ready, the fibre-channel initiator port 10c of the master disk subsystem 1 effects data transfer via the fibre channel 6 for remote copy. Upon completion of the writing of all the data, RSP is finally received from the fibre-channel target port 10d to complete the copy operation. At the same time, the remote dirty flag 53 of the relevant segment in which remote copy has been made in the cache memory 11 of the master disk subsystem 1 is reset (=1) to execute deletion from the side file (Step 205), and the updating of the individually used amount 33 for the corresponding host by subtraction is executed (Step 206).

Figure 5:
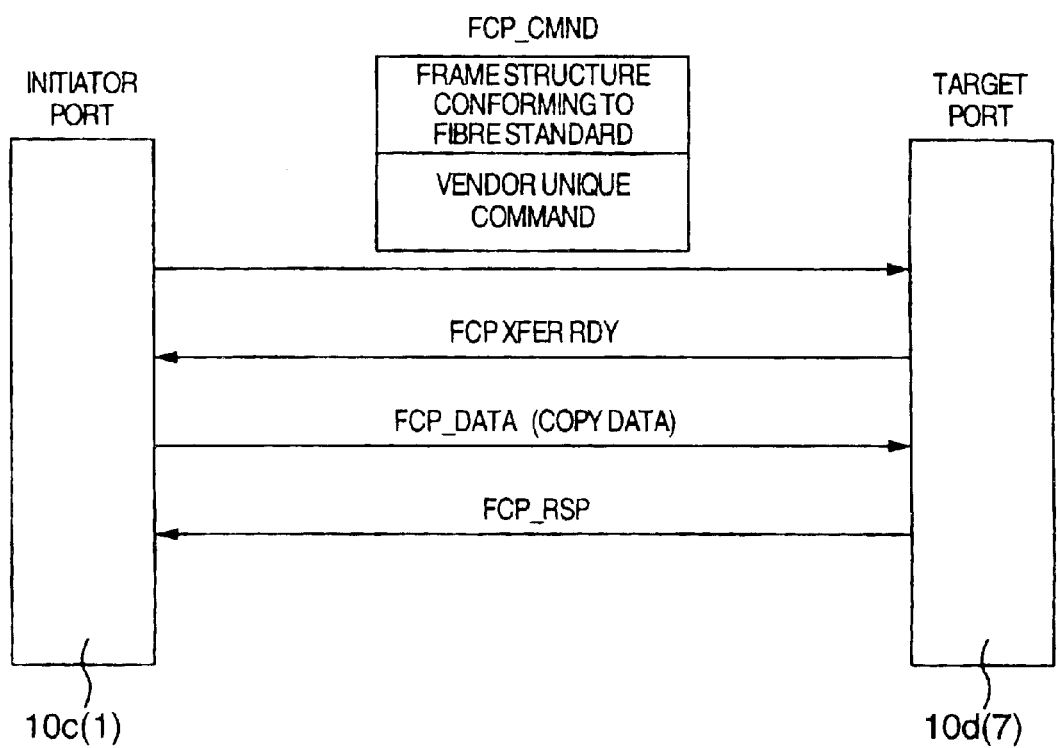
FIG. 5 is a conceptual diagram illustrating an example of the operation of remote copy in the storage subsystem in accordance with the embodiment of the invention.

An example of a sequence of exchange of commands and data for remote copy between the master disk subsystem 1 and the remote disk subsystem 7 described above is shown in FIG. 5.

It should be noted that since the sequence of copy transfer effected by the fibre-channel initiator port 10c of the master disk subsystem 1 is determined by randomly selecting data (segment) for which the copy has not been completed in the side file (segment with the remote dirty flag 53=1) (Step 203), the data of the respective host computers are consequently remote copied with the priority which depends on the relative magnitude of the individual ratio threshold 32.

In the flowchart shown in FIG. 8, in a case where the master disk subsystem 1 has received a data write command from the mainframe host computer 5 via the mainframe-system channel 4, before copying to the remote side the mainframe-system channel target port 10b effects conversion of the data format at the timing of storage in the cache memory 11 (Step 103).

Figure 6:
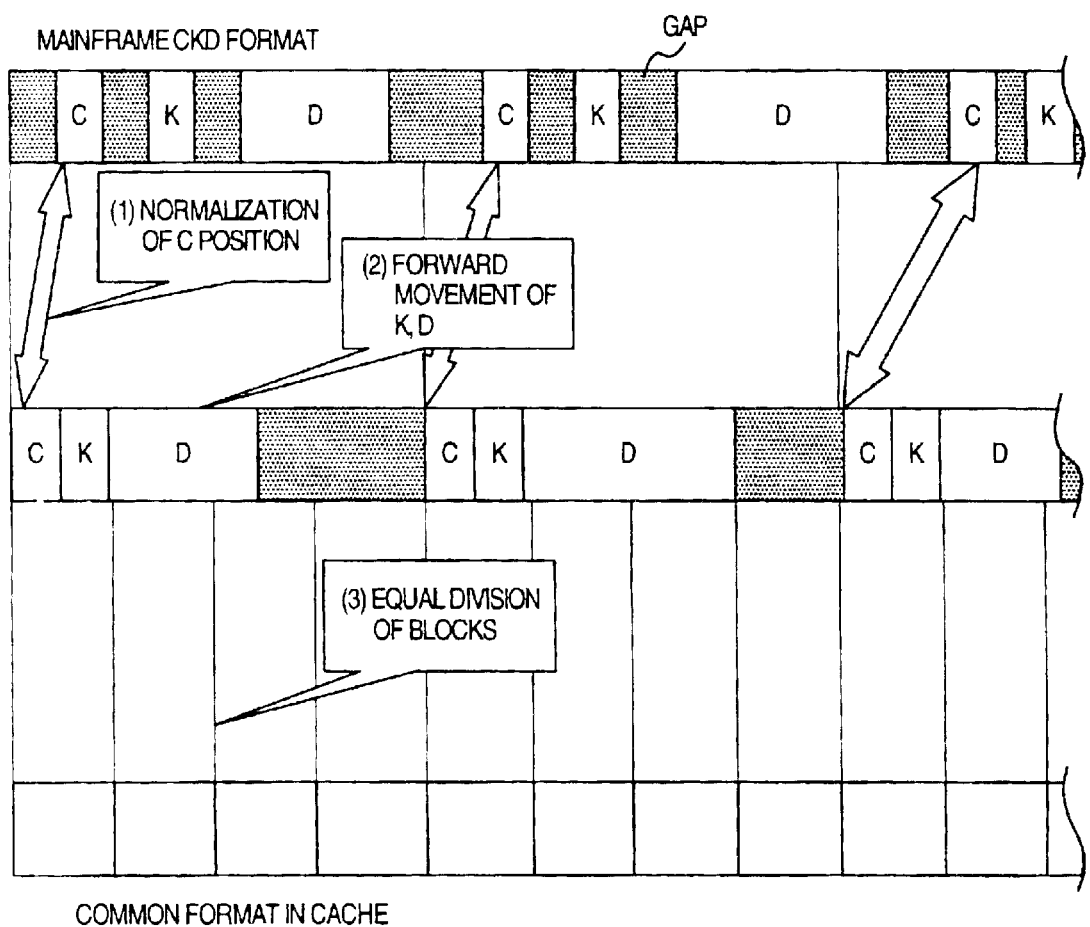
FIG. 6 is a conceptual diagram illustrating an example of a method of converting a data format in the storage subsystem in accordance with the embodiment of the invention.

FIG. 6 shows one example of the method of converting the data format at this time. The record of the CKD format used in the mainframe host computer system (mainframe host computer 5) is formed by a C portion (count portion), a K portion (key portion), and a D portion (data portion), and adjacent ones of the C portion, K portion, and D portion in the record as well as adjacent ones of the records are respectively divided by portions called gaps which do not contain data. The C portion, K portion, and D portion have variable lengths, respectively. In the SCSI standard which is generally used by open-system host computers, the block which is a unit of data storage has a fixed size, so that the data of the CKD data format cannot be transferred (remote copied) as it is by a command conforming to the SCSI-FCP. Accordingly, the mainframe-system channel target port 10b of the master disk subsystem 1, while receiving the write data from the host (mainframe host computer 5), sets the position of the C portion so as to be located at the head of a corresponding fixed-length block, discards the gap portions, and moves the ensuing K and D portions forward before storing the data in the cache memory 11. In addition, a breaking gap is filled between the adjacent records. The reason for placing the position of the C portion of each record at the head of the corresponding block is to ensure that when access is made from the mainframe host computer 5, the search of the target record can be effected at high speed by simple calculation. Subsequently, the data stored in the cache memory 11 is handled as being divided into fixed-length blocks. Also at the time of storing data from the cache memory 11 to the disk array 12, and at the time of data copy to the remote disk subsystem 7 via the fibre channel 6 for remote copy, the data is handled in the same way as the open-system data.

Other than the data-format conversion processing, the remote copy operation from the master disk subsystem 1 to the remote disk subsystem 7 is common. The control for effecting influx limitation by using the total ratio threshold 40 and the individual ratio thresholds 32 is also applied to the connection of the mainframe host computer 5. However, since a simple delay by sleep cannot be sustained for a long time in the light of the standard of interface with the mainframe host computer 5, a response for requesting a command retry is returned as a means for causing the mainframe host computer 5 to wait, and the data held temporarily in the cache memory 11 at the time of receipt of the write command in Step 103 is discarded (Steps 107 and 109 in FIG. 8).

As for the fibre-channel initiator port 10c of the master disk subsystem 1 and the fibre-channel target port 10d of the remote disk subsystem 7, ports of the same structure can be used without distinguishing between the open computer use and the mainframe host computer use.

Figure 10:
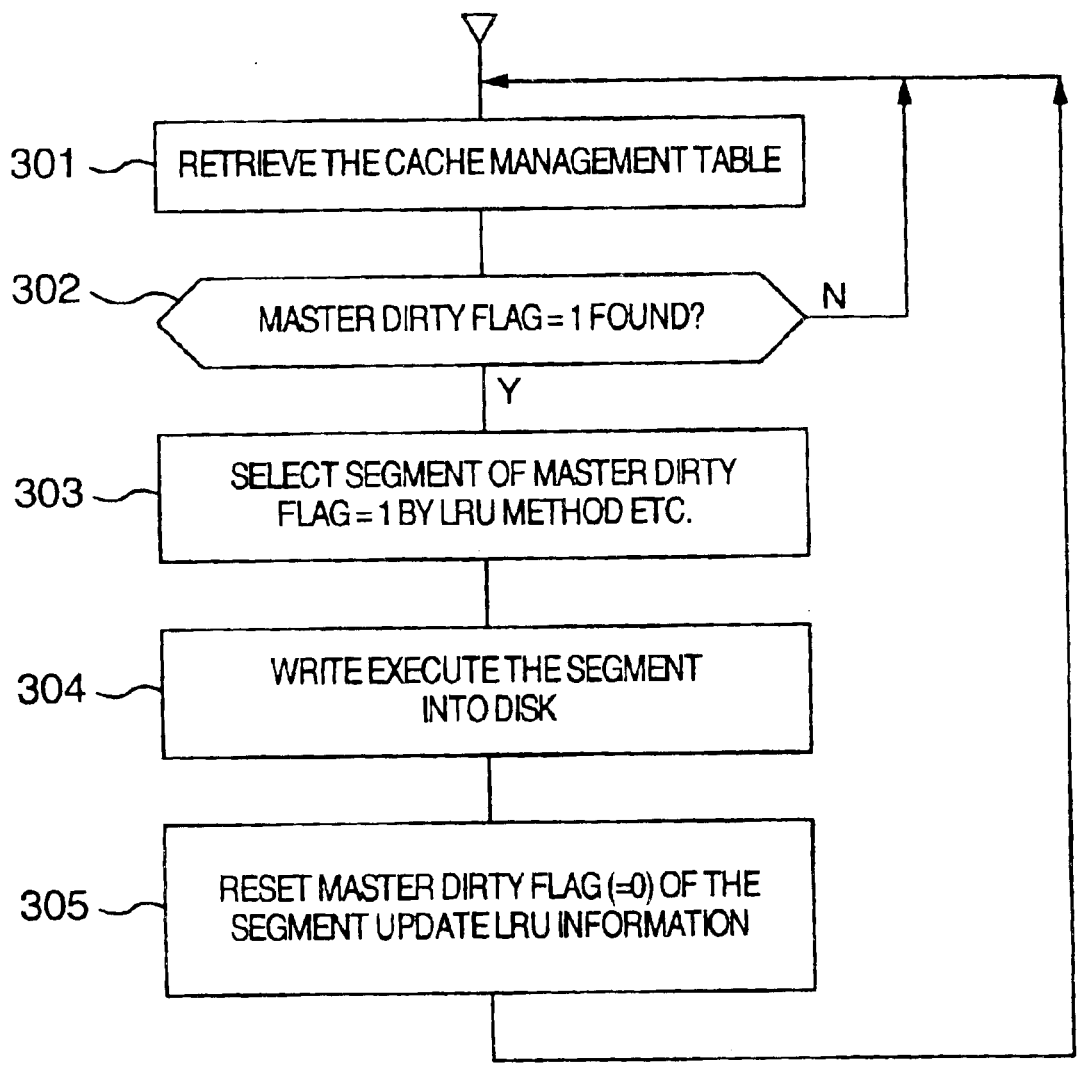
FIG. 10 is a flowchart illustrating an example of the operation of the storage subsystem in accordance with the embodiment of the invention.

Referring to the flowchart shown in FIG. 10, a description will be given of an example of processing in which the write data in the cache memory 11 is reflected on the disk array 12.

The disk adapter 12a retrieves the cache management able 50 of the shared memory 11-1 (Step 301), and checks whether or not there is unreflected data (segments with master dirty flag 52=1) in the disk (Step 302) If it is present, the disk adapter 12a selects an oldest segment, i.e., a segment remaining in the cache memory 11 for a long time, by the method of LRU or the like (Step 303), and executes the writing of that segment in the disk array 12 (Step 304). Subsequently, the disk adapter 12a rests (=0) the master dirty flag 52 of the relevant segment, and updates the LRU management information 54 (Step 305).

Figure 7:
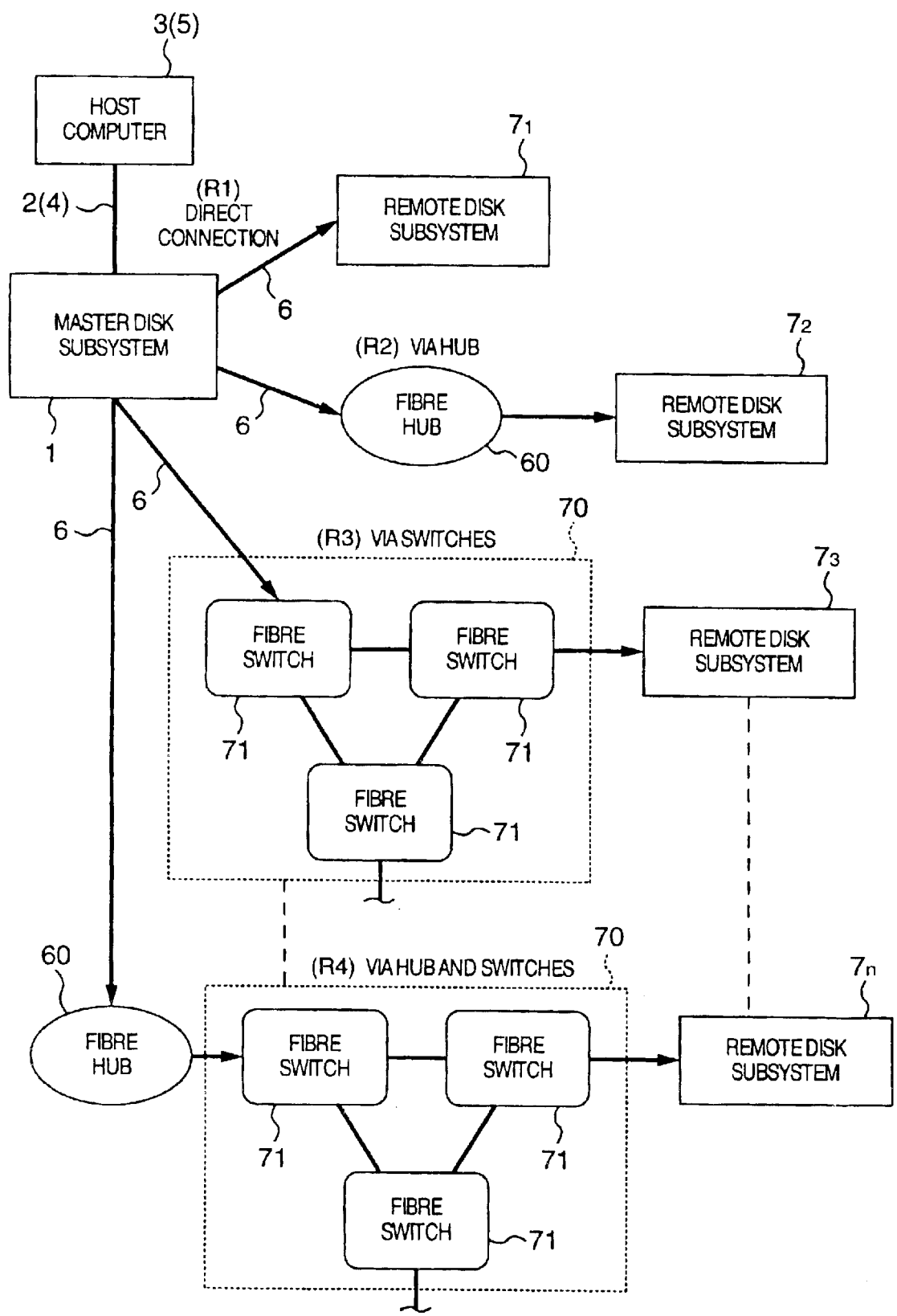
FIG. 7 is a conceptual diagram illustrating a modification of a method of connecting storage subsystems on the basis of Fibre Channel Protocol in the storage subsystem in accordance with the embodiment of the invention.

In this embodiment, since Fibre Channel Protocol is used for the paths of remote copy, the following routes are conceivable as shown in FIG. 7: a route (R1) for directly connecting the master side to the remote side by a fibre channel cable; a route (R2) for connecting to the remote side via a fibre channel hub 60; a route (R3) which is linked to a fabric 70 through fibre channel switches 71 and is connected to the remote side; and a route (R4) which is linked to a fabric 70 through fibre channel switches 71 via a fibre channel hub 60 and is connected to the remote side. All the methods of connecting these routes (R1) to (R4) are connection modes standardized in Fibre Channel Protocol. As described above, in the case of this embodiment, all the routes between the fibre-channel target port 10a of the master disk subsystem 1 and the fibre-channel target port 10d of the remote disk subsystem 7 conform to a general Fibre Channel protocol, so that connections can be made by using equipment complying with FC-AL.

As described above, in accordance with this embodiment, in a case where a plurality of host computers are connected to the master disk subsystem 1 for effecting remote copy to the remote disk subsystem 7, the side files in the cache memories 11 which are shared resources can be used by being efficiently distributed in accordance with the degrees of importance of the respective hosts by using the ratio information such as the individual ratio threshold 32 set for each host, the total ratio threshold 40, and the like. Therefore, the data of the respective host computers can be reliably remote copied from the master disk subsystem 1 to the remote disk subsystem 7 side in accordance with the order of priority intended by the user.

Accordingly, for example, in the event that the writing of data in a large volume from a specific host computer has occurred in the master disk subsystem 1, input/output processing of other host computers with high priorities is not affected, and the operation of remote copy can be continued while accepting access from the host computers with high priorities.

In addition, in the case of this embodiment, after the data format of the CKD type of the mainframe-system channel protocol is converted to a data format conforming to the open-system Fibre-Channel-Protocol channel, the storage in the disk array 12 and the remote copy to the remote disk subsystem 7 are executed. Therefore, by using only one kind of fibre channel 6 for remote copy as the connecting interface between the master disk subsystem 1 and the remote disk subsystem 7, remote copy is possible by similar control not only with respect to the open system connecting to the Fibre-Channel-Protocol channels but also with respect to the CKD format data handled by the mainframe host computer. Thus, it becomes possible to structure a low-cost and efficient remote copy system.

As described above, although a specific description has been given of the embodiment of the invention, the invention is not limited to the above-described embodiment, and it goes without saying that various modifications are possible within the scope which does not depart from its gist.

For example, although in the description of the above-described embodiment indices of the limitation of data influx are obtained by making a comparison between the automatically measured side-file used capacity (the individually used amounts 33 and the total amount used 34) and the total ratio threshold 40 and the individual ratio thresholds 32 set in advance by the user via the SVP 14, the present invention includes the addition to a storage control unit and the like of control logic for determining indices of the above-described various thresholds on the basis of statistical information, such as the side-file used amount and the like, which are automatically measured over a long period of time.

In accordance with the embodiment of the invention, it is possible to obtain an advantage in that it is possible to effect remote copy of write data among a plurality of storage subsystems with the order of priority corresponding to the degrees of importance of the plurality of host computers connected to the storage subsystems.

In addition, in accordance with the embodiment of the invention, it is possible to obtain another advantage in that it is possible to realize efficient remote copy among a plurality of storage subsystems without being affected by an increase in the load of data writing by a specific host computer among a plurality of host computers connected to the storage subsystems.

Furthermore, in accordance with the embodiment of the invention, it is possible to obtain yet another advantage in that it is possible to structure an efficient remote copy system by uniformalizing diverse connection interfaces between a plurality of host computers and storage subsystems to a connection interface among the plurality of storage subsystems for effecting the remote copy of data.

What is claimed is:

1. A storage apparatus comprising:
a first storage subsystem for connection to a plurality of host computers via a first interface;
a second storage subsystem connected to the first storage subsystem via a second interface so as to copy write data written in the first storage subsystem from the host computers onto the second storage subsystem from the first storage subsystem, thereby protecting the write data in the first and the second storage subsystems in a multiplex manner; and
a storage control unit for the first storage subsystem, having: a first threshold for controlling for each of the host computers an occupancy ratio of the write data whose copy to the second storage subsystem is incomplete in a data buffer in the first storage subsystem, and control logic for delaying the processing of a data write request from each of the host computers on the basis of the first threshold which is set for each of the host computers, wherein data received from at least one of the host computers is converted to a format compatible with transfer to the second storage subsystem, prior to copying thereof to the second storage subsystem.

2. The apparatus of claim 1, wherein:

the at least one host computer is a mainframe computer, and the first storage subsystem receives data from the mainframe computer in CKD format.

3. The apparatus to claim 2, wherein the first storage subsystem converts the data received in CKD format into a format having fixed-length data blocks.

4. The apparatus of claim 1, wherein the first storage subsystem performs the conversion before loading the data from the at least one of the host computers into the data buffer.

5. The storage subsystem according to claim 1, wherein the control logic in the storage control unit causes the processing of a data write request from a host computer to be delayed when the occupancy ratio of the write data whose copy to the second storage subsystem is incomplete in the data buffer in the first storage subsystem has reached the first threshold.

6. The storage subsystem according to claim 1, wherein the storage control unit further has a second threshold for controlling an occupancy ratio of an aggregate total of the write data whose copy to the second storage subsystem is incomplete in the data buffer by the plurality of host computers, and the storage control unit further includes control logic for controlling a start of operation for delaying the processing of the data write requests from the host computers, on the basis of the second threshold.

7. The storage subsystem according to claim 6, wherein the control logic for controlling the start of the operation causes the processing of the write requests on the basis of the first threshold to be delayed when the aggregate total of the write data whose copy to the second storage subsystem is incomplete has reached the second threshold.

8. The storage subsystem according to claim 1, wherein the first interface consists of at least one of a mainframe-system host interface and an open-system host interface, and the second interface consists of a fibre channel interface.

9. A storage subsystem, comprising:

a storage array for storage of data;

at least one first interface, for receiving data for storage in the array from a plurality of host computers;

a second interface for transfer of data for copying to a remote storage subsystem;

a data buffer for storing data received from the host computers, for transfer through the second interface for copying to the remote storage system; and a storage control unit, having: a threshold for controlling for each of the host computers an occupancy ratio of the data whose copy to the remote storage subsystem is incomplete in the data buffer, and control logic for delaying the processing of a data write request from each respective host computer on the basis of the threshold which is set for each respective host computer, wherein data received from at least one of the host computers is converted to a format compatible with transfer to the remote storage subsystem, prior to transfer through the second interface for copying thereof to the remote storage subsystem.

10. The storage subsystem of claim 9, wherein the at least one first interface provides an interface for a mainframe computer and is adapted to receive data from the mainframe computer in CKD format.

11. The storage subsystem of claim 9, wherein the conversion converts the data received in CKD format into a format having fixed-length data blocks.

12. The storage subsystem of claim 9, wherein the conversion is performed before loading the data from the at least one of the host computers into the data buffer.

13. A method of controlling a master storage subsystem connected to a plurality of host computers via a first interface and connected to a remote storage subsystem via a second interface so as to copy write data from the host computers to the remote storage subsystem, thereby protecting the write data in a multiplex manner, the method comprising:

setting for each of the host computers a first threshold for controlling an occupancy ratio of the write data whose copy to the remote storage subsystem is incomplete in a data buffer in the master storage subsystem;

converting data received from at least one of the host computers to a format compatible with transfer to the second storage subsystem, prior to copying thereof to the second storage subsystem; and delaying processing of a data write request from each of the host computers based on the first threshold is set for each of the host computers.

14. The method of claim 13, wherein:

the at least one host computer is a mainframe computer, and the first storage subsystem receives data from the mainframe computer in CKD format.

15. The method to claim 14, wherein the step of converting comprises converting the data received in CKD format into a format having fixed-length data blocks.

16. The method of claim 13, wherein the converting step is performed before loading the data from the at least one of the host computers into the data buffer.

17. The method of claim 13, wherein in the delaying step, the processing of the data write request from one of the host computers is delayed when the occupancy ratio of the write data from the one host computer in the data buffer in the master storage subsystem has reached the first threshold.

18. The method of claim 13, further comprising:

setting a second threshold for controlling an occupancy ratio of an aggregate total of the write data in the data buffer by the plurality of host computers; and controlling a start of the delaying step based on the second threshold.

19. The method of claim 18, wherein the step of controlling the start of the delaying step comprises delaying processing of a write request based the first threshold when the aggregate total of the write data whose copy to the remote storage subsystem is incomplete has reached the second threshold.

* * * * *